US012803037B2

(12) United States Patent
Park et al.

(10) Patent No.: US 12,803,037 B2
(45) Date of Patent: Nov. 17, 2026

(54) ELECTRODE ASSEMBLY MANUFACTURING DEVICE AND ELECTRODE ASSEMBLY

(71) Applicant: LG ENERGY SOLUTION, LTD., Seoul (KR)

(72) Inventors: Jongsik Park, Daejeon (KR); Yonggu Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 712 days.

(21) Appl. No.: 18/267,043

(22) PCT Filed: Mar. 3, 2022

(86) PCT No.: PCT/KR2022/003054
§ 371 (c)(1),
(2) Date: Jun. 13, 2023

(87) PCT Pub. No.: WO2022/191510
PCT Pub. Date: Sep. 15, 2022

(65) Prior Publication Data
US 2024/0313252 A1 Sep. 19, 2024

(30) Foreign Application Priority Data
Mar. 8, 2021 (KR) ........................ 10-2021-0030407

(51) Int. Cl.
*H01F 7/06* (2006.01)
*B65H 26/02* (2006.01)
(Continued)

(52) U.S. Cl.
CPC ........ *H01M 10/0409* (2013.01); *B65H 26/02* (2013.01); *G01N 21/892* (2013.01);
(Continued)

(58) Field of Classification Search
CPC ..... G06T 7/0006; G06T 7/001; G06T 7/0014; G06T 7/60; G06T 2207/20081;
(Continued)

(56) References Cited

U.S. PATENT DOCUMENTS 4,844,312 A * 7/1989 Gomi .................. H01F 41/0213 226/21
6,026,563 A * 2/2000 Schilson ............... B29C 66/939 156/55
(Continued)

FOREIGN PATENT DOCUMENTS

JP 2010-177068 A 8/2010
JP 4595500 B2 12/2010
(Continued)

OTHER PUBLICATIONS

International Search Report (PCT/ISA/210) issued in PCT/KR2022/003054, dated Jun. 20, 2022.
(Continued)

*Primary Examiner* — Paul D Kim
(74) *Attorney, Agent, or Firm* — Birch, Stewart, Kolasch & Birch, LLP

(57) ABSTRACT

A manufacturing apparatus of an electrode assembly includes first and second machine visions provided on driving-direction front ends of first and second electrodes from a winding core to measure first non-overlap widths between first width-direction end portions of the first and second electrodes and first width-direction end portions of first and second separators, respectively; a controller collecting vision data obtained from the first and second machine visions; setting a non-overlap width between the first separator and the second separator to 0 through vision data, computing a third non-overlap width between the first width-direction end portions of the first and second electrodes, and judging a meandering defect with the computed
(Continued)

third non-overlap width; a data processing unit configured to accumulate and process defect judgment data through machine learning; and an input unit configured to automatically input a meandering reference value based on the data processed by the data processing unit.

14 Claims, 5 Drawing Sheets

(51) Int. Cl.

| | |
|---|---|
| ***G01N 21/892*** | (2006.01) |
| ***G06T 1/00*** | (2006.01) |
| ***G06T 7/00*** | (2017.01) |
| ***G06T 7/60*** | (2017.01) |
| ***H01M 10/04*** | (2006.01) |

(52) U.S. Cl.
CPC .......... *G06T 1/0014* (2013.01); *G06T 7/0006* (2013.01); *G06T 7/001* (2013.01); *G06T 7/60* (2013.01); *H01M 10/0431* (2013.01); *B65H 2701/19* (2013.01); *G06T 2207/20081* (2013.01); *G06T 2207/30164* (2013.01)

(58) Field of Classification Search
CPC ...... G06T 2207/30164; G01N 21/8851; G01N 21/8914; G01N 21/892; G01N 2021/891; G01N 2021/8918; B65H 26/02; B65H 2701/19; Y02E 60/10; Y02P 70/50; H01M 10/0409; H01M 10/0431
See application file for complete search history.

(56) References Cited

U.S. PATENT DOCUMENTS

| | | | | |
|---|---|---|---|---|
| 8,397,372 | B2 | 3/2013 | Hori et al. | |
| 12,100,796 | B2 * | 9/2024 | Kim | B65H 23/038 |
| 2020/0127317 | A1 | 4/2020 | Lee et al. | |
| 2022/0035362 | A1 | 2/2022 | Hatakenaka | |
| 2022/0131175 | A1 | 4/2022 | Lee et al. | |

FOREIGN PATENT DOCUMENTS

| | | | |
|---|---|---|---|
| JP | 4716138 | B2 | 7/2011 |
| JP | 6246684 | B2 | 12/2017 |
| JP | 2018-63873 | A | 4/2018 |
| JP | 2018-170103 | A | 11/2018 |
| KR | 10-0507434 | B1 | 8/2005 |
| KR | 10-2010-0113111 | A | 10/2010 |
| KR | 10-1479723 | B1 | 1/2015 |
| KR | 10-1479724 | B1 | 1/2015 |
| KR | 10-2017-0102973 | A | 9/2017 |
| KR | 10-2020-0109042 | A | 9/2020 |
| WO | WO2020/217644 | A1 | 10/2020 |

OTHER PUBLICATIONS

Japanese Office Action for Japanese Application No. 2023-535067, dated Jun. 24, 2024, with English translation.

Indian Office Action and Search Report for Indian Application No. 202317041492, dated Jul. 23, 2026, with English translation.

* cited by examiner

ELECTRODE ASSEMBLY MANUFACTURING DEVICE AND ELECTRODE ASSEMBLY

TECHNICAL FIELD

This application claims priority to and the benefit of Korean Patent Application No. 10-2021-0030407 filed in the Korean Intellectual Property Office on Mar. 8, 2021, the entire contents of which are incorporated herein by reference.

The present invention relates to a manufacturing apparatus of an electrode assembly and a manufacturing method of the electrode assembly.

BACKGROUND ART

In manufacturing a cylindrical secondary battery, controlling meandering is an important factor. However, positional precisions of an electrode and a separator deteriorate, and as a result, meandering may occur upon winding and a safety accident such as ignition, etc., may occur.

When a jelly-roll type electrode assembly is manufactured by winding a positive electrode, the separator, a negative electrode, and the separator at a winding core while consecutively supplying the positive electrode, the separator, the negative electrode, and the separator, positions of the positive electrode, each of the separator, the negative electrode, and the separator is measured using an edge position sensor (EPS) and the meandering is controlled through a relative comparison of the measurement value in related art.

In general, the relative comparison is performed by a method such as a method for measuring a non-overlap width between the positive electrode and the negative electrode by an X-ray or a method for checking a real thing by disassembling a jelly-roll by an actual worker, and there is a problem in that this is not delicate by depending on a subjective judgment of the worker. However, the subjective judgment of the worker causes a problem in that the jelly-roll in which the meandering occurs is mis-sorted as an adequate product in some cases, and as a result, an accident that multiple defective jelly-rolls leak in a subsequent process.

Further, a meandering inspection of the jelly-roll is temporarily performed through a sampling inspection or only when there is a change such as material replacement. However, there is a problem in that the meandering inspection is not performed except for the case where the meandering inspection is temporarily performed as such.

As described above, the relative comparison which depends on the subjective judgment of the worker and the meandering inspection which is intermittently performed cannot but be incomplete, and as a result, it is necessary to improve this.

DISCLOSURE

Technical Problem

In order to solve the above-described problem, the present invention has been made in an effort to provide a manufacturing apparatus of an electrode assembly and a manufacturing method of the electrode assembly, which implement automation, thereby achieving meandering prevention.

However, a problem to be solved by the present invention is not limited to the above-described problem, and other problems not mentioned in the present specification will be able to be clearly appreciated by those skilled in the art from a description of the invention to be described below.

Technical Solution

In order to achieve the above-described object, according to one aspect of the present invention, provided is a manufacturing apparatus of an electrode assembly, which includes:

a first machine vision provided on a driving-direction front end of a first electrode from a winding core, the first machine vision being configured to measure a first non-overlap width between a first width-direction end portion of the first electrode and a first width-direction end portion of a first separator;

a second machine vision provided on a driving-direction front end of a second electrode from the winding core, the second machine vision being configured to measure a second non-overlap width between a first width-direction end portion of a second electrode and a first width-direction end portion of a second separator;

a controller configured to collect vision data obtained from the first machine vision and the second machine vision, set a non-overlap width between the first separator and the second separator to 0 through vision data, compute a third non-overlap width between the first width-direction end portion of the first electrode and the first width-direction end portion of the second electrode, and judge a meandering defect with the computed third non-overlap width;

a data processing unit configured to accumulate and process defect judgment data through machine learning; and an input unit configured to automatically input a meandering reference value based on the data processed by the data processing unit.

Further, according to one aspect of the present invention, provided is a manufacturing method of an electrode assembly, which includes:

measuring a first non-overlap width between a first width-direction end portion of a first electrode and a first width-direction end portion of a first separator by a first machine vision provided on a driving-direction front end of the first electrode from a winding core;

measuring a second non-overlap width between a first width-direction end portion of a second electrode and a first width-direction end portion of a second separator by a second machine vision provided on a driving-direction front end of the second electrode;

collecting vision data obtained from the first machine vision and the second machine vision by a controller;

setting a non-overlap width between the first separator and the second separator to 0 through vision data by the controller;

computing a third non-overlap width between the first width-direction end portion of the first electrode and the first width-direction end portion of the second electrode by the controller;

judging a meandering defect with the computed third non-overlap width by the controller;

accumulating and processing defect judgment data through machine learning by a data processing unit; and automatically inputting a meandering reference value based on the data processed by the data processing unit.

Advantageous Effects

In a manufacturing apparatus and a manufacturing method of an electrode assembly according to one aspect of the present invention, since whether a defect occurs can be simultaneously discriminated upon manufacturing a jelly-roll type electrode assembly, a defect rate of a secondary battery in which a defective electrode assembly is embedded can be reduced.

Further, in the manufacturing apparatus and the manufacturing method of an electrode assembly according to the present invention, a human error which occurs from a worker can be reduced. Alternatively, meandering reverse can be confirmed in real time without sampling. Alternatively, an adequate product can be produced without meandering reverse in a subsequent process by collecting data.

However, the effects which can be obtained through the present invention are not limited only to the above-described effects, and other technical effects not mentioned herein will be able to be clearly understood from the description of the invention to be described later by those skilled in the art.

BEST MODE FOR THE INVENTION

Figure 1:
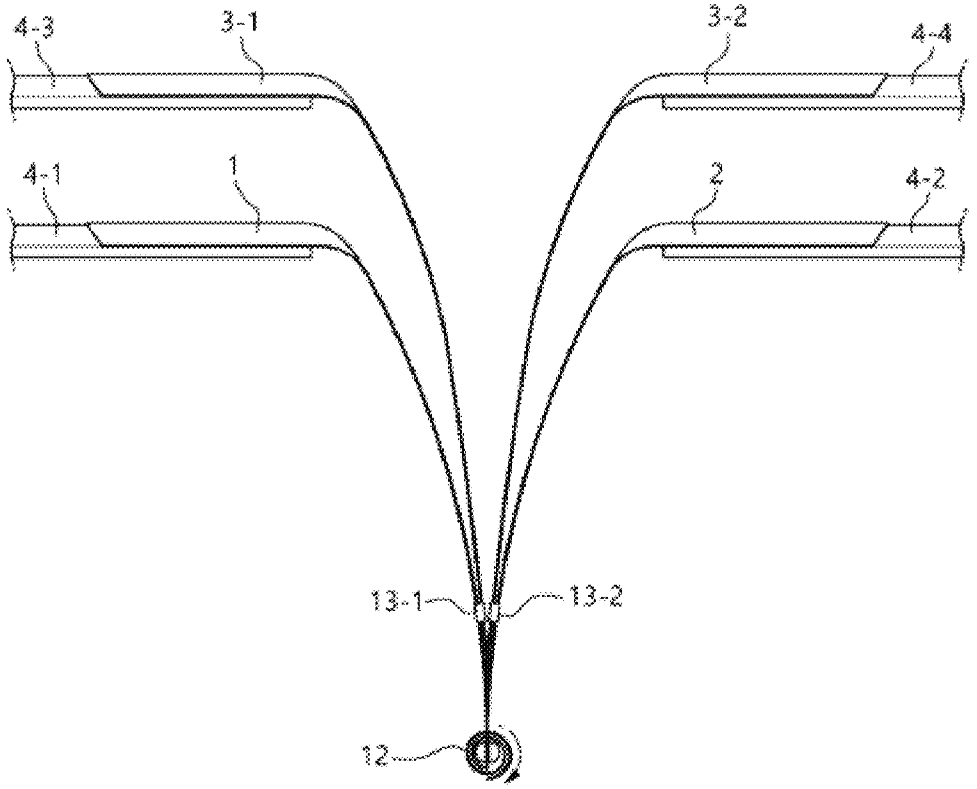
FIG. 1 illustrates a conventional manufacturing apparatus of an electrode assembly.

The present invention may have various modifications and various embodiments and specific embodiments will be illustrated in the drawings and described in detail in the detailed description. However, this does not limit the present invention to specific embodiments, and it should be understood that the present disclosure covers all the modifications, equivalents and replacements included within the technical spirit and technical scope of the present invention.

In the present specification, terms including as first, second, A, B, and the like are used for describing various constituent elements, but the constituent elements are not limited by the terms. The terms are used only to discriminate one element from another element. For example, a first component may be referred to as a second component, and similarly, the second component may be referred to as the first component without departing from the scope of the present invention.

In the present specification, a term "and/or" includes a combination of a plurality of related items or some of the plurality of related items.

In the present specification, when a certain component is expressed as a singular number, the certain component may include a plurality of concepts even though is not separately specified in the present specification.

In the present specification, in respect to terms such as "include", "have", etc., unless separately specified in the present specification, a feature, a number, a step, an operation, a process, a component, a member, etc., or a combination thereof mean an existence itself, and does not mean excluding another feature, another number, etc.

In the present specification, "secondary battery" refers to a battery which is repeatedly usable for a long time through recharging. The secondary battery may be categorized into a nickel-cadmium battery, a lithium-ion secondary battery, etc., according to an electrode active material. The secondary battery may be categorized into a pouch type secondary battery, a square type secondary battery, a cylindrical secondary battery, etc., according to a type.

In the present specification, the secondary battery may include a battery can receiving an electrode assembly. The battery can may be cylindrical.

In the present specification, the term "cylindrical secondary battery" refers to a secondary battery having a cylinder shape or a type similar thereto. The cylindrical secondary battery which is generally used for large-capacity electronic and electric devices due to a characteristic in which energy density per volume is high may be used in a form in which a plurality of cylindrical secondary batteries are combined to constitute a battery pack.

In the present specification, the cylindrical secondary battery may refer to, for example, a structure in which a rivet penetrated and inserted into a bottom surface opposite to the opening portion of the cylindrical secondary battery is used as a negative electrode and a battery can itself is used as a positive electrode.

In the present specification, the secondary battery may include a battery can receiving an electrode assembly. The battery can may be cylindrical, and in respect to a size of the battery can, circular diameters of both end portions may be 30 to 55 mm and a height may be 60 to 120 mm. For example, the circular diameter×the height of the cylindrical battery can may be 46 mm×60 mm, 46 mm×80 mm, or 46 mm×90 mm, or 46 mm×120 mm.

Preferably, the cylindrical secondary battery may be, for example, a cylindrical secondary battery in which a ratio of a form factor (defined as a value acquired by dividing the diameter of the cylindrical secondary battery by the height, i.e., a ratio of a diameter @ to a height H) is larger than approximately 0.4.

The present specification, the term "cylindrical secondary battery" may be, for example, a 46110 cell, a 48750 cell, a 48110 cell, a 48800 cell, and a 46800 cell. In a numerical value representing the form factor, two preceding numbers represents the diameter of the cell, two subsequent numbers represent the height of the cell, and the last number 0 represent that a cross section of the cell is circular. When the height of the cell is 100 mm or more, three numbers are required to represent the height of the cell, and as a result, a last number, 0 is omittable.

The cylindrical secondary battery according to the present specification, for example, as a substantially cylinder shape cell may be a cylindrical secondary battery in which the diameter is approximately 46 mm, the height is approximately 110 mm, and the ratio of the form factor is approximately 0.418.

The cylindrical secondary battery according to the present specification, for example, as a substantially cylinder shape cell may be a battery cell in which the diameter is approximately 48 mm, the height is approximately 75 mm, and the ratio of the form factor is approximately 0.640.

The cylindrical secondary battery according to the present specification, for example, as a substantially cylinder shape cell may be a cylindrical secondary battery in which the diameter is approximately 48 mm, the height is approximately 110 mm, and the ratio of the form factor is approximately 0.418.

The cylindrical secondary battery according to the present specification, for example, as a substantially cylinder shape cell may be a battery cell in which the diameter is approximately 48 mm, the height is approximately 80 mm, and the ratio of the form factor is approximately 0.600.

The cylindrical secondary battery according to the present specification, for example, as a substantially cylinder shape cell may be a battery cell in which the diameter is approximately 46 mm, the height is approximately 80 mm, and the ratio of the form factor is approximately 0.575.

The cylindrical secondary battery according to the present specification, for example, as a substantially cylinder shape cell may be a cylindrical secondary battery in which the diameter is approximately 46 mm, the height is approximately 90 mm, and the ratio of the form factor is 0.511.

Further, a terminology "first electrode" refers to a negative electrode (or anode) and a terminology "second electrode" refers to the positive electrode (or cathode), but vice versa.

If it is not contrarily defined, all terms used herein including technological or scientific terms have the same meanings as those generally understood by a person with ordinary skill in the art.

Hereinafter, the related art and a preferred embodiment of the present invention will be described in detail with reference to the accompanying drawings.

Referring to FIG. 1, a conventional manufacturing apparatus of an electrode assembly is illustrated, and a winding core 12 is wound while rotating clockwise, and here, a first electrode 1, a first separator 3-1, a second electrode 2, and a second separator 3-2 move to the winding core 12, and an EPS 13-1 that measures a non-overlap width for the first electrode 1 and the first separator 3-1 and an EPS 13-2 that measures the non-overlap width for the second electrode 2 and the second separator 3-2 are installed. EPS as an abbreviation of edge position sensor is installed on a front end of a driving distance of an electrode (first electrode and second electrode) and a separator (first separator and second separator) on a width-direction end portion of the electrode or the separator to serve to measure a location of each of the electrode and the separator. Here, a worker observes the non-overlap width of the first electrode 1 and the first separator 3-1 and the non-overlap width of the second electrode 2 and the second separator 3-2 from two EPSs 13-1 and 13-2, and the worker calculates a meandering reference value by personally performing measurement, judgment, and computation steps in order to adjust meandering by combing values of the non-overlap widths. However, a human error occurs in each step, and when the worker mis-inputs the meandering reference value, a problem in that even a case of a meandering defect is judged as an adequate product also occurs.

According to one implementation example of the present invention, provided is a manufacturing apparatus of an electrode assembly, which includes:

a first machine vision provided on a driving-direction front end of a first electrode from a winding core and measuring a first non-overlap width between one width-direction end portion of the first electrode and one width-direction end portion of a first separator, and a second machine vision provided on a driving-direction front end of a second electrode from the winding core, and measuring a second non-overlap width between one width-direction end portion of a second electrode and one width-direction end portion of a second separator;

a control unit collecting vision data obtained from the first machine vision and the second machine vision, setting a non-overlap width between the first separator and the second separator to 0 through vision data, computing a third non-overlap width between the width-direction end portion of the first electrode and the width-direction end portion of the second electrode, and judging a meandering defect with the computed third non-overlap width;

a data processing unit accumulating and processing defect judgment data through machine learning; and an input unit automatically inputting a meandering reference value based on the data processed by the data processing unit.

Figure 2:
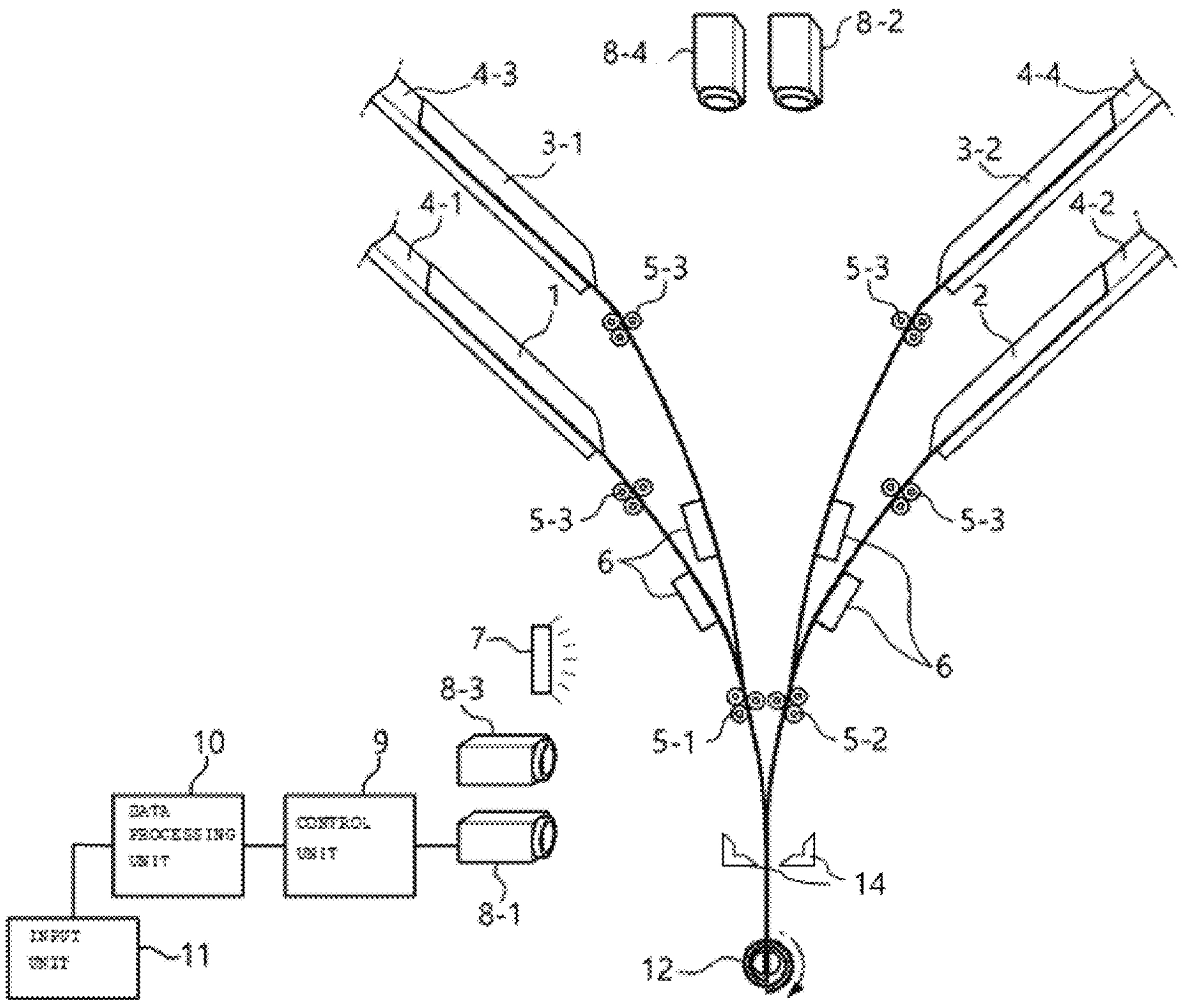
FIG. 2 illustrates a manufacturing apparatus of an electrode assembly according to an embodiment of the present invention.

In regard to the implementation example, referring to FIG. 2, first and second machine visions 8-1 and 8-2 are provided on driving-direction front ends of the electrodes 1 and 2 and the separators 3-1 and 3-2. Here, the first machine vision 8-1 measures a first non-overlap width between the width-direction end portion of the first electrode 1 and the width-direction end portion of the first separator 3-1, and the second machine vision 8-2 measures a second non-overlap width between the width-direction end portion of the second electrode 2 and the width-direction end portion of the second separator 3-2.

In the implementation example, "width direction" means a direction of a short side in each of the first electrode, the second electrode, the first separator, and the second separator. In general, the width direction means a direction orthogonal to a length direction.

Figure 3:
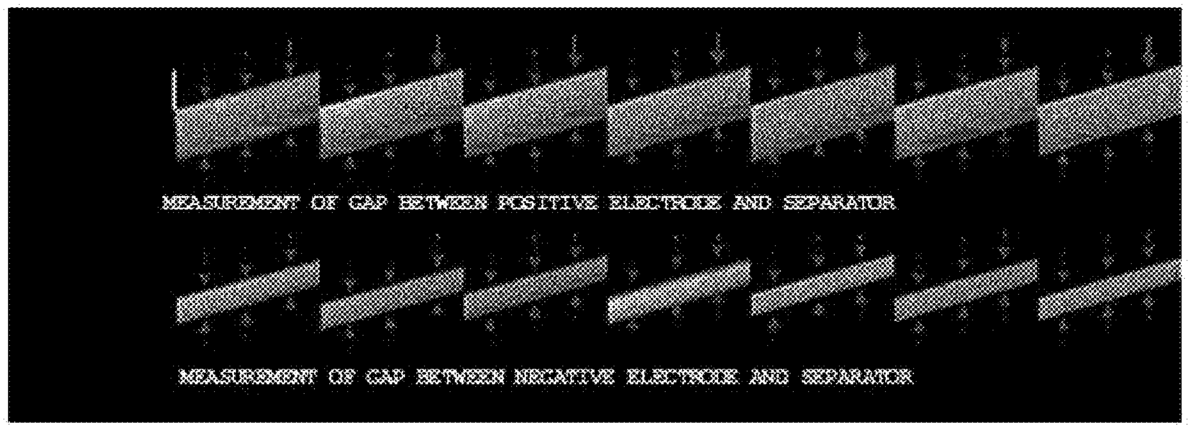
FIG. 3 illustrates image data acquired through a machine vision included in FIG. 2.
Figure 4:
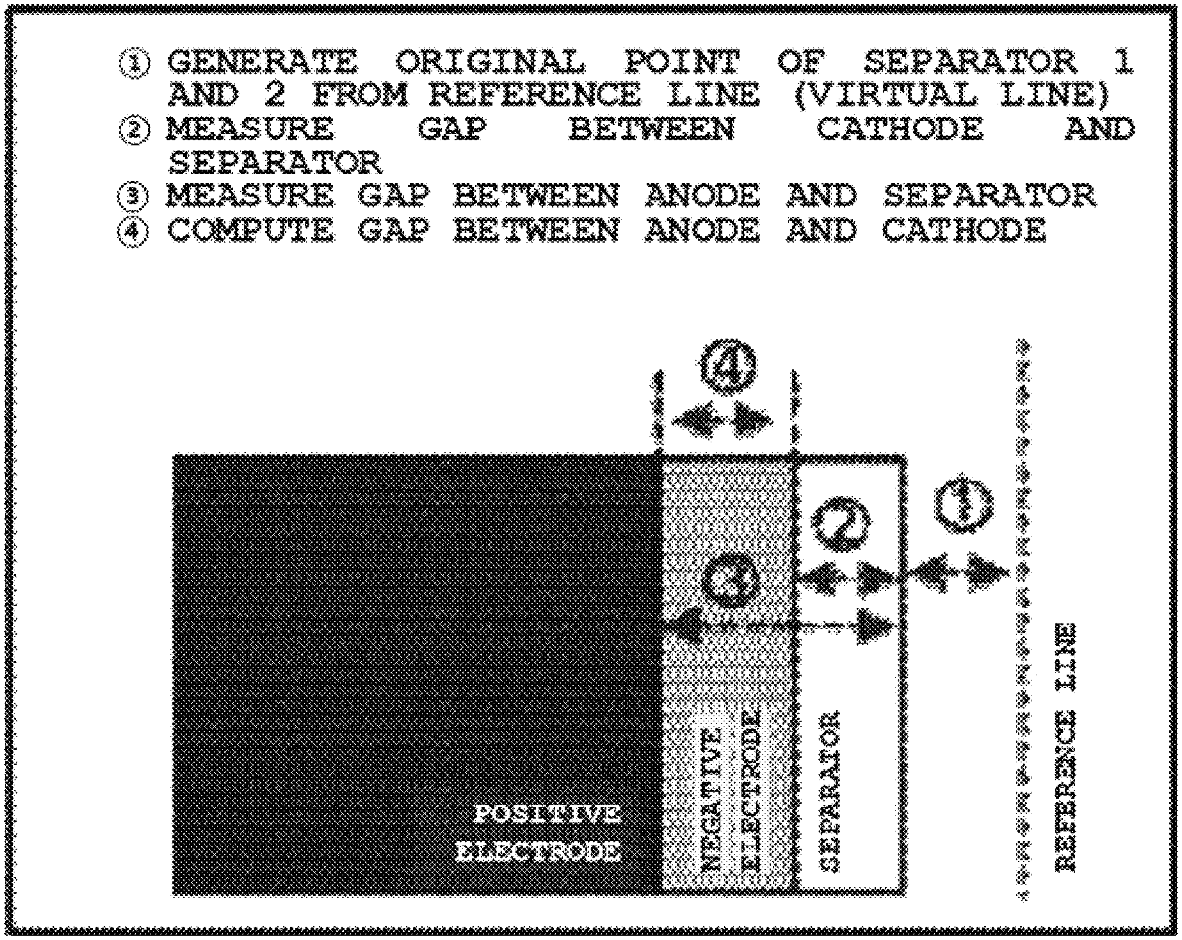
FIG. 4 is a schematic view of computing meandering by accumulating and processing the data of FIG. 3.

Further, the vision data which the control unit 9 acquires from the first machine vision 8-1 and the second machine vision 8-2 is illustrated in FIG. 3. Further, referring to FIG. 4, a reference line in which the non-overlap width between the first separator 3-1 and the second separator 3-2 is set to 0, and the third non-overlap width between the width-direction end portion of the first electrode 1 and the width-direction end portion of the second electrode 2 is computed through the first non-overlap width and the second non-overlap width.

Further, the control unit 9 judges whether the computed third non-overlap width is defective, the data processing unit 10 accumulates and processes the defect judgment data through the machine learning, and the input unit 11 automatically inputs the meandering reference value (a width of at least one of the first electrode, the second electrode, the first separator, and the second separator) based on the data processed by the data processing unit 10.

In the manufacturing apparatus of the electrode assembly according to the implementation example, the non-overlap width may be measured in real time by installing the machine vision on the driving-direction front ends of the electrode and the separator, since the meandering reference value is automatically input while the defect judgment data is accumulated and processed through the machine learning, the non-overlap width is measured by the worker and it is judged whether the non-overlap width is defective, and an effect of minimizing a human error which occurs as the meandering reference value is automatically input is provided.

According to an additional implementation example, provided is the manufacturing apparatus of the electrode assembly, which further includes one or all of a third machine vision provided on the driving-direction front end of the first electrode from the winding core and inspecting at least one of a bending of a first electrode coating edge and a first electrode tab of the other width-direction end portion of the first electrode, and a fourth machine vision provided on the driving-direction front end of the second electrode from the winding core and inspecting at least one of a bending of a second electrode coating edge and a second electrode tab of the other width-direction end portion of the second electrode.

Figure 5:
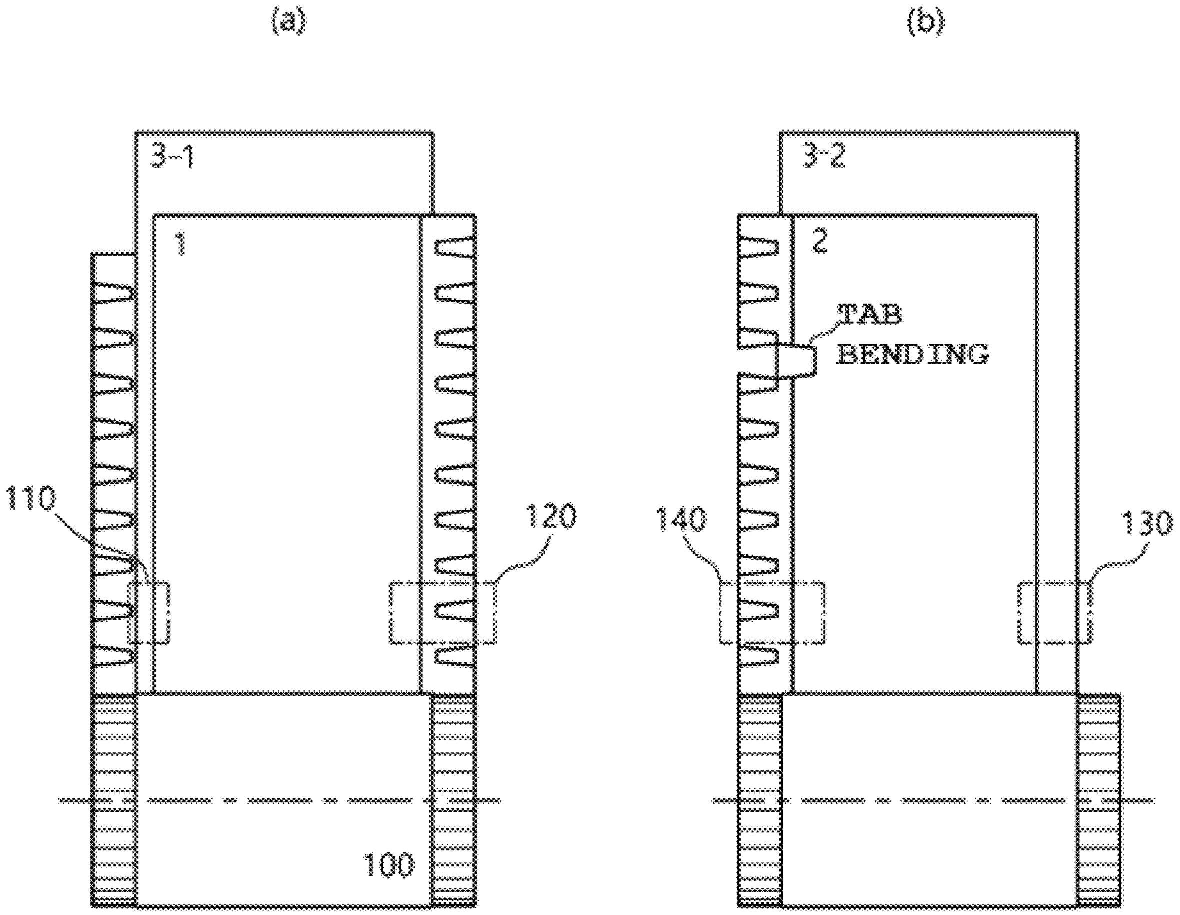
FIG. 5 is a schematic view related to manufacturing of the electrode assembly according to an embodiment of the present invention.

In regard to the implementation example, referring to FIGS. 2 and 5, a third machine vision 8-3 is disposed beside the first machine vision 8-1 and a fourth machine vision 8-4 is disposed beside the second machine vision 8-2. In the jelly-roll electrode assembly 100, the first machine vision 8-1 measures a first non-overlap width 110 between one width-direction end portion of the first electrode and one width-direction end portion of the first separator and the second machine vision 8-2 measures a second non-overlap width 130 between one width-direction end portion of the second electrode and one width-direction end portion of the second separator. Further, the third machine vision 8-3 inspects at least one of a bending of a first electrode coating edge 120 and a first electrode tab of the other width-direction end portion of the first electrode and the fourth machine vision 8-4 inspects at least one of a bending of a second electrode coating edge 140 and a second electrode tab of the other width-direction end portion of the second electrode. Selectively, the fourth machine vision may inspect alignment between the first separator 3-1 and the second separator 3-2.

According to an additional implementation example, provided is the manufacturing apparatus of the electrode assembly, which includes a first guide roller guiding the first electrode and the first separator to be in contact with each other at a portion spaced apart from the winding core by 5 to 60 mm or less, and a second guide roller guiding the second electrode and the second separator to be in contact with each other.

Selectively, each of the first guide roller and the second guide roller may be independently installed at a portion spaced apart from the winding core by 5 mm or more, 10 mm or more, 15 mm or more, 20 mm or more, 25 mm, or 30 mm or more. Alternatively, each of the first guide roller and the second guide roller may be independently installed at a portion spaced apart from the winding core by 60 mm or less, 55 mm or less, 50 mm or less, 45 mm or less, 40 mm, or 35 mm or less.

In regard to the implementation example, referring to FIG. 2, a first guide roller 5-1 and a second guide roller 5-2 are independently installed at a portion spaced apart from a winding core 12 by 5 to 60 mm or less so that the first electrode and the first separator are in contact with each other. The first guide roller 5-1 guides the first electrode 1 and the first separator 3-1 to be in contact with each other and the second guide roller 5-2 guides the second electrode 2 and the second separator 3-2 to be in contact with each other.

The manufacturing apparatus of the electrode assembly according to the implementation example provides an effect of accurately measuring the first non-overlap width of the first electrode and the first separator and the second non-overlap width of the second electrode and the second separator.

According to an additional implementation example, provided is the manufacturing apparatus of the electrode assembly, which further includes: a supply line of the first electrode, the supply line of the first separator, the supply line of the second electrode, and the supply line of the second separator; and a winding core rotating and winding one length-direction end portion while fixing one length-direction end portion of each of the first electrode, the first separator, the second electrode, and the second separator.

In regard to the implementation example, referring to FIG. 2, the first electrode 1 is supplied through a supply line 4-1 of the first electrode, the second electrode 2 is supplied through a supply line 4-2 of the second electrode, the first separator 3-1 is supplied through a supply line 4-3 of the first separator, and a second separator 3-2 is supplied through a supply line 4-4 of the second separator.

The winding core 12 is rotated while fixing a length-direction end portion of each of the first electrode 1, the first separator 3-1, the second electrode 2, and the second separator 3-2 to the winding core 12 to wind the length-direction end portion.

Selectively, the winding core 12 may be rotated in a clockwise direction or a counterclockwise direction.

Further, in the implementation example, "length direction" means a direction of a long side in each of the first electrode, the second electrode, the first separator, and the second separator.

According to an additional implementation example, provided is the manufacturing apparatus of the electrode assembly, which further includes a feed motor that is provided between each of the supply line of the first electrode, the supply line of the first separator, the supply line of the second electrode, and the supply line of the second separator, and the winding core, and inputs each of the first electrode, the first separator, the second electrode, and the second separator into the winding core.

In regard to the implementation example, referring to FIG. 2, the length-direction end portion is wound by rotating the winding core 12 while fixing the length-direction end portion of each of the first electrode 1, the first separator 3-1, the second electrode 2, and the second separator 3-2 to the winding corer 12, and the first electrode 1, the first separator 3-1, the second electrode 2, and the second separator 3-2 is input into the winding core 12 by using a feed motor 6.
According to an additional implementation example, provided is the manufacturing apparatus of the electrode assembly, which further includes a third guide roller that is provided between each of the supply line of the first electrode, the supply line of the first separator, the supply line of the second electrode, and the supply line of the second separator, and the feed motor to move to the feed motor from the supply line of the first electrode, the supply line of the first separator, the supply line of the second electrode, and the supply line of the second separator.

In regard to the implementation example, referring to FIG. 2, a third guide roller 5-3 allows the first electrode 1, the second electrode 2, the first separator 3-1, and the second separator 3-2 to be smoothly bent to a feed motor 6 from respective supply lines 4-1 to 4-4.

According to one implementation example, provided is the manufacturing apparatus of the electrode assembly, which further includes a cutter that is provided between the wining core and the feed motor, and cutting an electrode assembly input into the winding core.

Referring to FIG. 2, a cutter 14 is disposed between the winding core 12 and the feed motor 6 to serve to cut the electrode assembly.

According to one implementation example, provided is a manufacturing apparatus of the electrode assembly in which the cutter 14 glides between the winding core and the feed motor.

According to the implementation example, since the cutter 14 is a glidable model, terminals of the electrode and/or the separator may be controlled by adjusting a cutting location.

In regard to the implementation example, referring to FIG. 2, the cutter 14 is movable between the winding core 12 and the feed motor 6 to serve to cut the electrode assembly.

According to an additional implementation example, provided is the manufacturing apparatus of the electrode assembly, which includes an illumination between the feed motor and the first machine vision and/or the second machine vision.

According to an additional implementation example, the illumination may be a constant current type and/or a bar type.

According to an implementation example, provided is the manufacturing apparatus of the electrode assembly in which the illumination is the bar type illumination.

In regard to the implementation examples, referring to FIG. 2, an illumination 7 is disposed between the feed motor 6 and the first machine vision 8-1 and/or the second machine vision 8-2.

The manufacturing apparatus of the electrode assembly according to the implementation example provides an effect of providing a stable image to the machine vision.

According to an additional implementation example, provided is the manufacturing apparatus of the electrode assembly in which the illumination is installed at a portion a spaced part from the winding core by a distance of 130 to 170 mm.

According to an additional implementation example, the illumination 7 may be installed at a portion spaced apart from the winding core 12 by a distance of 130 mm or more, 135 mm or more, 140 mm or more, or 145 mm or more.

According to an additional implementation example, the illumination 7 may be installed at a portion spaced apart from the winding core 12 by a distance of 170 mm or less, 165 mm or less, 160 mm or less, or 155 mm or less.

According to an additional implementation example, the illumination 7 may be installed at a portion spaced apart from the winding core 12 by a distance of 150 mm.

According to an additional implementation example, provided is the manufacturing apparatus of the electrode assembly in which measurement portions of the first machine vision and the second machine vision are spaced apart from the winding core by 1 to 50 mm.

According to an additional implementation example, the measurement portions of the first machine vision 8-1 and the second machine vision 8-2 may be spaced apart from the winding core 12 by 1 mm or more, 5 mm or more, 10 mm or more, or 15 mm or more.

According to an additional implementation example, the measurement portions of the first machine vision and the second machine vision may be spaced apart from the winding core 12 by 50 mm or less, 45 mm or less, 40 mm less, 35 mm or less, 30 mm or less, or 25 mm or less.

According to an additional implementation example, the measurement portions of the first machine vision and the second machine vision may be spaced apart from the winding core 12 by 20 mm.

In regard to the implementation example, referring to FIG. 2, the measure portions of the first machine vision 8-1 and the second machine vision 8-2 are spaced apart by a proximal region (1 to 50 mm) from the winding core 12 at driving-direction front end portions of the first electrode, the first separator, the second electrode, and the second separator.

According to the manufacturing apparatus of the electrode assembly according to the implementation example, a system that directly monitors the locations of the electrode and the separator by the worker through the EPS installed in the winding corer portion in the related art is replaced and a region from the winding core by 10 mm or more and 50 mm or less is measured by the machine vision to provide an effect of reducing a human error.

According to one implementation example, provided is a manufacturing method of an electrode assembly, which includes: (A) measuring a first non-overlap width between one width-direction end portion of the first electrode and one width-direction end portion of a first separator by a first machine vision provided on a driving-direction front end of a first electrode from a winding core, and measuring a second non-overlap width between one width-direction end portion of a second electrode and one width-direction end portion of a second separator by a second machine vision provided on a driving-direction front end of a second electrode;

(B) collecting vision data obtained from the first machine vision and the second machine vision, setting a non-overlap width between the first separator and the second separator to 0 through vision data, computing a third non-overlap width between the width-direction end portion of the first electrode and the width-direction end portion of the second electrode, and judging a meandering defect with the computed third non-overlap width;

(C) accumulating and processing defect judgment data through machine learning; and (D) automatically inputting a meandering reference value based on the data processed by the data processing unit.

In step (A), the first machine vision 8-1 is provided on the driving-direction front ends of the first electrode 1 and the first separator 3-1 and the second machine vision 8-2 is provided on the driving-direction front ends of the second electrode 2 and the second separator 3-2. Here, the first machine vision 8-1 measures a first non-overlap width between one width-direction end portion of the first electrode 1 and one width-direction end portion of the first separator 3-1, and the second machine vision 8-2 measures a second non-overlap width between one width-direction end portion of the second electrode 2 and one width-direction end portion of the second separator 3-2.

Further, the vision data acquired from the first machine vision 8-1 and the second machine vision 8-2 are collected and a result thereof is illustrated in FIG. 3. Further, referring to FIG. 4, a reference line in which the non-overlap width between the first separator 3-1 and the second separator 3-2 is set to 0, and the third non-overlap width between the first non-overlap width-direction end portion and the second non-overlap width direction end portion is computed, and the meandering defect is judged by the computed third non-overlap width.

The defect judgment data is accumulated and processed through the machine learning, and a meandering reference value is automatically input based on the processed data. Here, the meandering reference value may be a width of at least one of the first electrode, the second electrode, the first separator, and the second separator, or at least one of driving velocities and input amounts of the electrode and the separator.

In the manufacturing method of the electrode assembly according to the implementation example, the non-overlap width may be measured in real time by installing the machine vision on the driving-direction front ends of the electrode and the separator, since the meandering reference value is automatically input while the defect judgment data is accumulated and processed through the machine learning, the non-overlap width is measured by the worker and it is judged whether the non-overlap width is defective, and an effect of minimizing a human error which occurs as the meandering reference value is automatically input is provided.

According to an additional implementation example, provided is the manufacturing method of the electrode assembly, which further includes, before step (A), (A-1) supplying a first electrode, a first separator, a second electrode, and a second separator to a supply line of the first electrode, the supply line of the first separator, the supply line of the second electrode, and the supply line of the second separator, respectively; and (A-2) fixing a length-direction end portion of each of the first electrode, the first separator, the second electrode, and the second separator to a winding core.

Referring to FIG. 2, in step (A-1), the first electrode 1 is supplied through a supply line 4-1 of the first electrode, the second electrode 2 is supplied through a supply line 4-2 of the second electrode, the first separator 3-1 is supplied through a supply line 4-3 of the first separator, and a second separator 3-2 is supplied through a supply line 4-4 of the second separator.

In step (A-2), the length-direction end portion of each of the first electrode 1, the first separator 3-1, the second electrode 2, and the second separator 3-2 is fixed to the winding core 12.

Concrete contents regarding the manufacturing method of the electrode assembly according to the implementation example are described as above.

According to an additional implementation example, provided is the manufacturing method of the electrode assembly, in which step (B) further includes one or all of (B-1) inspecting, by a third machine vision provided on the driving-direction front end of the first electrode from the winding core, at least one of a bending of a first electrode coating edge and a first electrode tab of the other width-direction end portion of the first electrode, and (B-2) inspecting, by a fourth machine vision provided on the driving-direction front end of the second electrode from the winding core, at least one of a bending of a second electrode coating edge and a second electrode tab of the other width-direction end portion of the second electrode.

Concrete contents regarding the manufacturing method of the electrode assembly according to the implementation example are described as above.

Although the preferred examples of the present invention are described through the above description, but the present invention is not limited thereto and various medications can be made within the claims and the range the detailed description of the invention, and this also belongs to the scope of the present invention.

EXPLANATION OF REFERENCE NUMERALS AND SYMBOLS

1: First electrode
2: Second electrode
3-1: First separator
3-2: Second separator
4-1: Supply line of first electrode
4-2: Supply line of second electrode
4-3: Supply line of first separator
4-4: Supply line of second separator
5-1: First guide roller
5-2: Second guide roller
5-3: Third guide roller
6: Feed motor
7: Illumination
8-1: First machine vision
8-2: Second machine vision
8-3: Third machine vision
8-4: Fourth machine vision
9: Control unit
10: Data processing unit
11: Input unit
12: Winding core
13-1, 13-2: Edge Position Sensor (EPS)
14: Cutter
100: Jelly-roll electrode assembly
110: First non-overlap width
120: First electrode coating edge
130: Second non-overlap width
140: Second electrode coating edge

The invention claimed is:

1. A manufacturing apparatus of an electrode assembly, comprising:

a first machine vision provided on a driving-direction front end of a first electrode from a winding core, the first machine vision being configured to measure a first non-overlap width between a first width-direction end portion of the first electrode and a first width-direction end portion of a first separator;

a second machine vision provided on a driving-direction front end of a second electrode from the winding core, the second machine vision being configured to measure a second non-overlap width between a first width-direction end portion of the second electrode and a first width-direction end portion of a second separator;

a controller configured to:

collect vision data obtained from the first machine vision and the second machine vision;

set a non-overlap width between the first separator and the second separator to Oto zero through the vision data;

compute a third non-overlap width between the first width-direction end portion of the first electrode and the first width-direction end portion of the second electrode; and judge a meandering defect with the computed third non-overlap width;

a data processing unit configured to accumulate and process defect judgment data through machine learning; and an input unit configured to automatically input a meandering reference value based on the defect judgment data processed by the data processing unit.

2. The manufacturing apparatus of an electrode assembly of claim 1, further comprising at least one of:

a third machine vision provided on the driving-direction front end of the first electrode from the winding core, the third machine vision being configured to inspect at least one of a bending of a first electrode coating edge and a first electrode tab of a second width-direction end portion of the first electrode; and a fourth machine vision provided on the driving-direction front end of the second electrode from the winding core, the fourth machine vision being configured to inspect at least one of a bending of a second electrode coating edge and a second electrode tab of a second width-direction end portion of the second electrode.

3. The manufacturing apparatus of an electrode assembly of claim 1, further comprising:

a first guide roller configured to guide the first electrode and the first separator to be in contact with each other at a location spaced apart from the winding core by 5 to 60 mm; and a second guide roller configured to guide the second electrode and the second separator to be in contact with each other.

4. The manufacturing apparatus of an electrode assembly of claim 1, further comprising:

a supply line of the first electrode, a supply line of the first separator, a supply line of the second electrode, and a supply line of the second separator, wherein the winding core is configured to rotate while fixing a first length-direction end portion of each of the first electrode, the first separator, the second electrode, and the second separator to wind the first electrode, the first separator, the second electrode, and the second separator.

5. The manufacturing apparatus of an electrode assembly of claim 4, further comprising a feed motor between the winding core and each of the supply line of the first electrode, the supply line of the first separator, the supply line of the second electrode, and the supply line of the second separator, to input each of the first electrode, the first separator, the second electrode, and the second separator into the winding core.

6. The manufacturing apparatus of an electrode assembly of claim 5, further comprising a third guide roller between each of the feed motors and the supply line of the first electrode, the supply line of the first separator, the supply line of the second electrode, and the supply line of the second separator.

7. The manufacturing apparatus of an electrode assembly of claim 5, further comprising a cutter between the winding core and the feed motors to cut the first electrode, the first separator, the second electrode, and the second separator input into the winding core.

8. The manufacturing apparatus of an electrode assembly of claim 7, wherein the cutter glides between the winding core and the feed motors.

9. The manufacturing apparatus of an electrode assembly of claim 5, further comprising an illuminator between the feed motors and the first machine vision.

10. The manufacturing apparatus of an electrode assembly of claim 9, wherein the illuminator is installed at a location spaced apart from the winding core by 130 to 170 mm.

11. The manufacturing apparatus of an electrode assembly of claim 1, wherein measurement portions of the first machine vision and the second machine vision are spaced apart from the winding core by 10 to 50 mm.

12. A manufacturing method of an electrode assembly, comprising:

measuring a first non-overlap width between a first width-direction end portion of a first electrode and a first width-direction end portion of a first separator by a first machine vision provided on a driving-direction front end of the first electrode from a winding core;

measuring a second non-overlap width between a first width-direction end portion of a second electrode and a first width-direction end portion of a second separator by a second machine vision provided on a driving-direction front end the second electrode;

collecting vision data obtained from the first machine vision and the second machine vision by a controller;

setting a non-overlap width between the first separator and the second separator to Oto zero through the vision data by the controller;

computing a third non-overlap width between the first width-direction end portion of the first electrode and the first width-direction end portion of the second electrode by the controller; and judging a meandering defect with the computed third non-overlap by the controller;

accumulating and processing defect judgment data through machine learning by a data processing unit; and automatically inputting a meandering reference value based on the defect judgment data processed by the data processing unit.

13. The manufacturing method of an electrode assembly of claim 12, further comprising, before measuring the first non-overlap width:

supplying the first electrode, the first separator, the second electrode, and the second separator to a supply line of the first electrode, a supply line of the first separator, a supply line of the second electrode, and a supply line of the second separator, respectively; and fixing a length-direction end portion of each of the first electrode, the first separator, the second electrode, and the second separator to the winding core.

14. The manufacturing method of an electrode assembly of claim 12, wherein collecting the vision data obtained from the first machine vision and the second machine vision includes at least one of:

inspecting, by a third machine vision provided on the driving-direction front end of the first electrode from the winding core, at least one of a bending of a first electrode coating edge and a first electrode tab of a second width-direction end portion of the first electrode, and inspecting, by a fourth machine vision provided on the driving-direction front end of the second electrode from the winding core, at least one of a bending of a second electrode coating edge and a second electrode tab of a second width-direction end portion of the second electrode.

* * * * *